US012659005B2

(12) United States Patent
Svendsen et al.

(10) Patent No.: US 12,659,005 B2
(45) Date of Patent: Jun. 16, 2026

(54) UTILIZATION OF SSB RESOURCES

(71) Applicant: Nokia Technologies Oy, Espoo (FI)

(72) Inventors: Simon Svendsen, Aalborg (DK);
Samantha Caporal Del Barrio,
Aalborg (DK); Benny Vejlgaard,
Aalborg (DK); Frank Frederiksen,
Aalborg (DK)

(73) Assignee: Nokia Technologies Oy, Espoo (FI)

( * ) Notice: Subject to any disclaimer, the term of this
patent is extended or adjusted under 35
U.S.C. 154(b) by 358 days.

(21) Appl. No.: 18/257,066

(22) PCT Filed: Jan. 26, 2021

(86) PCT No.: PCT/EP2021/051657
§ 371 (c)(1),
(2) Date: Jun. 12, 2023

(87) PCT Pub. No.: WO2022/161591
PCT Pub. Date: Aug. 4, 2022

(65) Prior Publication Data
US 2024/0049154 A1 Feb. 8, 2024

(51) Int. Cl.
*H04B 7/06* (2006.01)
*H04W 16/28* (2009.01)
*H04W 56/00* (2009.01)

(52) U.S. Cl.
CPC ........ *H04B 7/06952* (2023.05); *H04W 16/28*
(2013.01); *H04W 56/0015* (2013.01)

(58) Field of Classification Search
CPC ... H04B 7/06952; H04B 7/086; H04W 16/28;
H04W 56/0015; H04L 5/0023; H04L
5/005; H04L 5/0048; H04L 5/0091
See application file for complete search history.

(56) References Cited

U.S. PATENT DOCUMENTS

| | | | |
|---|---|---|---|
| 2020/0067755 A1* | 2/2020 | Pan | H04L 27/266 |
| 2020/0275493 A1* | 8/2020 | Park | H04B 7/06952 |

(Continued)

FOREIGN PATENT DOCUMENTS

WO WO-2019047228 A1 * 3/2019 ........... H04L 5/0091

OTHER PUBLICATIONS

"3rd Generation Partnership Project; Technical Specification Group
Radio Access Network; NR; Radio Resource Control (RRC) pro-
tocol specification (Release 15)", 3GPP TS 38.331, V15.10.0, Jul.
2020, pp. 1-539.

(Continued)

*Primary Examiner* — Gary Mui
*Assistant Examiner* — Nancy Sixto
(74) *Attorney, Agent, or Firm* — Barta Jones, PLLC

(57) ABSTRACT

Based on a configuration of a pre-allocated sequence of first
SSBs of a first predetermined number, which comprise
second SSBs of a second predetermined number and third
SSBs of a third predetermined number, a network apparatus
of an access network of a cellular communication system
determines (S503) a usage for resources associated with the
third SSBs. According to the configuration of the pre-
allocated sequence of first SSBs, the second SSBs are to be
utilized in a beam management procedure including an
initial access procedure and the third SSBs are not neces-
sarily to be utilized in the beam management procedure
including the initial access procedure which enables UEs to
gain initial access to the cellular communication system via
the access network. The network apparatus broadcasts
(S505) the usage in the beam management procedure.

8 Claims, 7 Drawing Sheets

(56) References Cited

U.S. PATENT DOCUMENTS

| | | | | |
|---|---|---|---|---|
| 2021/0321349 A1* | 10/2021 | Tang | .................... | H04L 5/0094 |
| 2021/0336687 A1* | 10/2021 | Pezeshki | .............. | H04W 16/28 |
| 2021/0392593 A1* | 12/2021 | Nagarajan | ............ | H04W 48/16 |

OTHER PUBLICATIONS

"On Beam Management Enhancement", 3GPP TSG-RAN WG1 Meeting #103-e, R1-2008438, Agenda: 8.1.1, Apple Inc, Oct. 26-Nov. 13, 2020, 19 pages.
"Enhancements on Multi-Beam Operation", 3GPP TSG RAN WG1 #103-e, R1-2008977, Agenda: 8.1.1, Intel Corporation, Oct. 26-Nov. 13, 2020, pp. 1-16.
"3rd Generation Partnership Project; Technical Specification Group Radio Access Network; NR; Physical layer procedures for data (Release 16)", 3GPP TS 38.214, V16.3.0, Sep. 2020, pp. 1-166.
"3rd Generation Partnership Project; Technical Specification Group Radio Access Network; Study on New Radio Access Technology Physical Layer Aspects (Release 14)", 3GPP TR 38.802, V14.2.0, Sep. 2017, pp. 1-144.
"3rd Generation Partnership Project; Technical Specification Group Radio Access Network; NR; Physical layer procedures for data (Release 16)", 3GPP TS 38.214, V16.4.0, Dec. 2020, pp. 1-169.
"3rd Generation Partnership Project; Technical Specification Group Radio Access Network; NR; Physical layer procedures for control (Release 15)", 3GPP TS 38.213, V15.5.0, Mar. 2019, pp. 1-104.
International Search Report and Written Opinion received for corresponding Patent Cooperation Treaty Application No. PCT/EP2021/051657, dated Oct. 15, 2021, 13 pages.

* cited by examiner

Fig. 2

```
-- ASN1START
-- TAG-SIB2-START

SIB2 ::=                         SEQUENCE {
    cellReselectionInfoCommon         SEQUENCE {...},
    cellReselectionServingFreqInfo    SEQUENCE {...},
    intraFreqCellReselectionInfo      SEQUENCE {...},
    ...
}

RangeToBestCell    ::= Q-OffsetRange

-- TAG-SIB2-STOP
-- ASN1STOP
```

```
intraFreqCellReselectionInfo     SEQUENCE {
    q-RxLevMin                       Q-RxLevMin,
    q-RxLevMinSUL                    Q-RxLevMin,                              OPTIONAL,   -- Need R
    q-QualMin                        Q-QualMin,                              OPTIONAL,   -- Need S
    s-IntraSearchP                   ReselectionThreshold,
    s-IntraSearchQ                   ReselectionThresholdQ,                  OPTIONAL,   -- Need S
    t-ReselectionNR                  T-Reselection,
    frequencyBandList                MultiFrequencyBandListNR-SIB            OPTIONAL,   -- Need S
    frequencyBandListSUL             MultiFrequencyBandListNR-SIB            OPTIONAL,   -- Need R
    p-Max                            P-Max                                   OPTIONAL,   -- Need S
    smtc                             SSB-MTC                                 OPTIONAL,   -- Need S
    ss-RSSI-Measurement              SS-RSSI-Measurement                     OPTIONAL,   -- Need R
    ssb-ToMeasure                    SSB-ToMeasure                           OPTIONAL,   -- Need S
    deriveSSB-IndexFromCell          BOOLEAN,
    Remaining ssb                    BIT STRING (SIZE (1))                   OPTIONAL,
    ...,
    [[
    t-ReselectionNR-SF               SpeedStateScaleFactors                  OPTIONAL    -- Need N
    ]]
},
```

Fig. 8

UTILIZATION OF SSB RESOURCES

RELATED APPLICATION

This application claims priority to PCT Application No. PCT/EP2021/051657 filed Jan. 26, 2021, which is incorporated herein by reference in its entirety.

TECHNICAL FIELD

At least some example embodiments relate to beam management in New Radio (NR) communication systems. In particular, at least some example embodiments relate to a method, an apparatus and a non-transitory computer-readable storage medium for utilizing Synchronization Signal Block (SSB) resources.

BACKGROUND

According to 5G New Radio (NR) Release 15, for a gNB a frequency range (FR) 2 at mmWave frequencies (25.24 GHz to 52.6 GHz) has been introduced, which in addition involves the utilization of narrow high gain radiation beams at both gNB and UE. Legacy FR1 (410 MHz to 7125 MHz) has so far only used limited beamforming at gNBs and omnidirectional like antennas at UE.

The high gain radiation beams are needed for FR2 to improve the link budget between the gNB and the UE, since the higher frequency range also results in a smaller wavelength of the Electro-Magnetic (EM) signals. A theoretical isotropic antenna will transmit the delivered energy (as EM waves) equally in all directions and the power density of the EM signal will decrease as the waves travel from the transmitting antenna to the receiving antenna. The propagation loss between two antennas is dependent on the distance and the aperture (physical size) of the antennas. As such, a half-wave (dipole) or quarter-wave (monopole) antenna will have a larger aperture for lower frequencies and therefore also be more energy effective (larger area to collect the EM signal) and will result in a better link budget for a fixed distance, than at higher frequencies. The link budget could be increased by increasing the power delivered to the antenna at FR2 compared to FR1, however, this is not a very efficient solution, since PA efficiency decreases with power level and frequency. The link budget can also be improved for FR2 by increasing the aperture of the used antennas, whereby the antennas will become more energy effective in the direction facing the increased aperture. As such, increasing the aperture of an antenna to multiple wavelengths (for example an antenna array) will increase the gain is some directions but at the same time reduce the gain in other directions, making the antenna directive. The directivity will increase for higher desired gain resulting in a narrow radiation beam.

In conclusion, using high gain antennas with narrow radiation beams for FR2 to increase the link budget will also require beam management at both the gNB and the UE, to ensure that both entities have configured directive narrow beams that are aligned toward each other. Hence, selection of the best beam pair has to be performed.

The current beam alignment procedure is described in 3GPP TR 38.802 v14.2.0 section 6.1.6 and in TS 38.214 v16.4.0 section 5.2

LIST OF ABBREVIATIONS

3GPP 3rd Generation Partnership Project
5G Fifth Generation

CQI Channel Quality Information
CSI Channel State Information
DL Downlink
EM Electro-Magnetic
FR Frequency Range
gNB Next Generation Node B
IA Initial Access
MIB Master Information Block
MIMO Multiple Input Multiple Output
NR New Radio
OFDM Orthogonal Frequency-Division Multiplexing
P Phase
PA Power-Added
RACH Random Access Channel
RI Rank Indicator
RRC Radio Resource Control
RS Reference Signal
RSRP RS Received Power
RX Receiver
SCS Sub-Carrier-Spacing
SIB System Information Block
SSB Synchronization Signal Block
TX Transmitter
UE User Equipment

CITATION LIST

3GPP TR 38.802 v14.2.0 section 6.1.6
3GPP TS 38.214 v16.4.0 section 5.2
3GPP TS38.213 v15.5.0
3GPP TS 38.331 v15.10.0 (2020-07)

SUMMARY

As described above, beam management/alignment is needed to cover multiple UEs scattered in all directions. For example, to figure out which direction is the one that can reach the receiver with the best signal quality, the receiving UE evaluates the quality of a specific reference signal (Synchronization Signal Block, SSB) of multiple beams from the gNB.

Transmitting different beams in predefined directions in a burst in a regular interval is called beam sweeping or SS burst. For example, in a beam management procedure including an initial access procedure and an RRC connected mode, an SSB is repeated in predefined directions (beams) in time domain in a predetermined time period of e.g. 5 ms. This SS burst will be repeated with a predetermined time interval of e.g. 20 ms. The maximum number of predefined directions (beams/SSBs) in the SS burst set is frequency dependent, from 6 GHz to 52.6 GHz it is 64. The SSB sequence is specified and fixed by 3GPP (TS38.213) for different implementations of Sub-Carrier-Spacings (SCSs). To be more precise, SSBs are the same for all SCSs, but the time duration of a symbol changes with SCS. An SSB comprises four symbols PSS, PBCH, SSS, PBCH. The sequence will be pre-allocated and communicated to UEs in the initial access procedure via System Information Block (SIB) 1. A gNB operating at a lower SCS is not required to utilize all of the SSBs initially allocated for a higher SCS, and can be configured to a lower number. Such down-scaling is also communicated to the UEs via SIB1 and the remaining SSBs are in principle not utilized. To be more precise, an SS burst duration is 5 ms and the actual time needed and the number of pre-allocated SSBs within an SSB sweep scale with SCS and frequency. Then, if there are remaining pre-allocated SSBs within the 5 ms burst duration, these remaining pre-allocated SSBs are what is not utilized.

According to at least some example embodiments, a network apparatus of an access network of a cellular communication system, e.g. a gNB, is enabled to dynamically broadcast information to UEs within its sector, what the resources associated with the remaining allocated SSBs potentially are used for in case the gNB is configured for a reduced number of SSBs.

According to at least some example embodiments, this is achieved by a method, an apparatus and a non-transitory storage computer-readable storage medium as specified by the appended claims.

According to at least some example embodiments, the gNB allocates resources associated with remaining allocated (but unused) SSBs to transmit SSB-like reference signals with a wide beam that covers the full sector of the gNB.

According to at least some example embodiments, UEs are enabled to share the SSB-like reference signals with other UEs in Phase #3 of beam alignment to be described in more detail below.

According to at least some example embodiments, the gNB configures the resources associated with the remaining allocated SSBs to repeat the SSB sweep pattern.

According to at least some example embodiments, the gNB broadcasts which configuration is used for the resources associated with the remaining SSBs.

According to at least some example embodiments, full utilization of the allocated SSB resources is achieved without significant increase in the associated signaling overhead.

In the following example embodiments will be described with reference to the accompanying drawings.

BRIEF DESCRIPTION OF THE DRAWINGS

FIG. 2 shows a schematic diagram illustrating different SSB configurations depending on system numerology and system frequency.

FIG. 8 shows a schematic diagram illustrating signal implementation according to at least some example embodiments.

DESCRIPTION OF THE EMBODIMENTS

Figure 1:
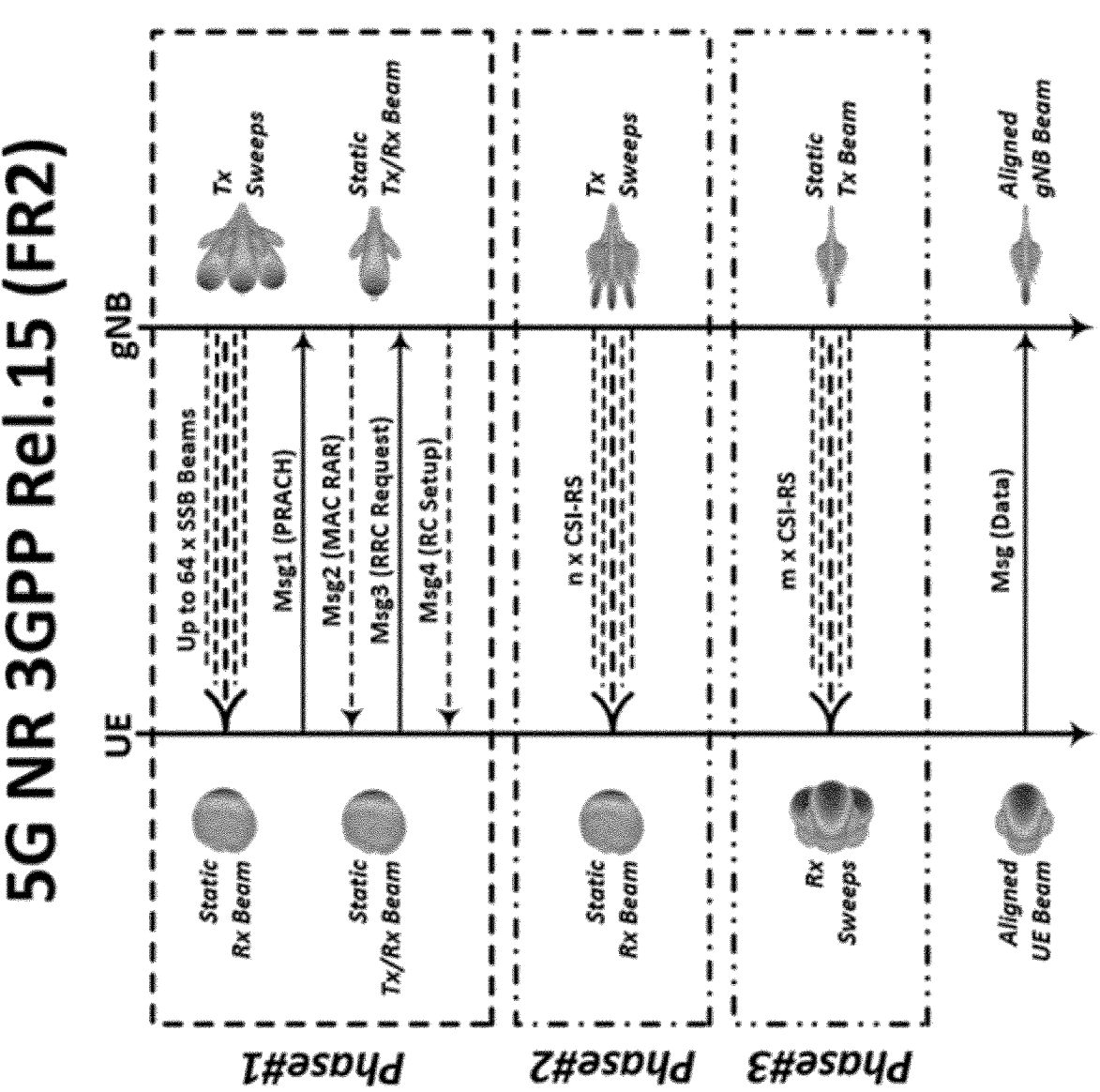
FIG. 1 shows a schematic diagram illustrating a 5G 3GPP Release 15 FR2 beam alignment procedure.

As described above, the current beam alignment procedure is described in 3GPP TR 38.802 v14.2.0 section 6.1.6 and in TS 38.214 v16.4.0 section 5.2, and the alignment procedure includes 3 main phases as briefly described below with reference to FIG. 1. A more detailed description of the 3 phases will be given later on.

Phase #1 (P1): UE is configured for broad beam RX while gNB is performing DL SSB beam sweeping. UE measures RSRP for the SSB beams received and reports back to the gNB using same beam configuration as in RX, at the next time instance (RACH Group) which corresponds to the information decoded (MIB, SIB1 & SIB2) from the best SSB beam seen from the UE.

Phase #2 (P2): UE is configured for broad beam RX while gNB is performing refined DL CSI-RS beam sweeping. UE measures RSRP (or CQI & RI) for CSI-RS or SSB beams received and reports best beam ID back to gNB using same beam configuration as in RX.

Phase #3 (P3): gNB transmits with best beam found in Phase #2 and UE is sweeping refined RX beam settings for identification of the best narrow RX beam.

At the end of P3, alignment between gNB TX beam and UE RX beam is obtained for maximized directional gain and minimum interference to other users in serving and neighbor cells.

In particular, in Phase #1, the gNB will transmit common Synchronization Signal Blocks (SSBs) in different predefined angular directions with a given periodicity. The allocated number of SSBs in each burst depends on the system numerology and system frequency as shown in Table 1 below.

TABLE 1

| Parameter | Numerology ($\mu$) | | | | |
| --- | --- | --- | --- | --- | --- |
| | 0 | 1 | 2 | 3 | 4 |
| Subcarrier Spacing (kHz) | 15 | 30 | 60 | 120 | 240 |
| Max allowed SSBs for FR1 (<3 GHz) | 4 | 4 | 4 | — | — |
| Max allowed SSBs for FR1 (>3 Ghz) | 8 | 8 | 8 | — | — |
| Max allowed SSBs for FR2 | — | — | — | 64 | 64 |
| OFDM Symbol Duration | 66.67 | 33.33 | 16.67 | 8.33 | 4.17 |
| Cyclic Prefix Duration | 4.69 | 2.34 | 1.17 | 0.57 | 0.29 |
| OFDM Symbol including CP | 71.35 | 35.68 | 17.84 | 8.92 | 4.46 |

The duration (which is also referred to here as "time period") of an SSB burst is 5 ms independent on the system numerology and the default periodicity is 20 ms with a specified range of 5 ms up to 160 ms. Here, the periodicity is also referred to as "time interval". The independency of the system numerology relates to the decreasing OFDM symbol length with increasing system numerology, whereby more symbols can be allocated within the same time span, as illustrated in FIG. 2.

Figure 2:
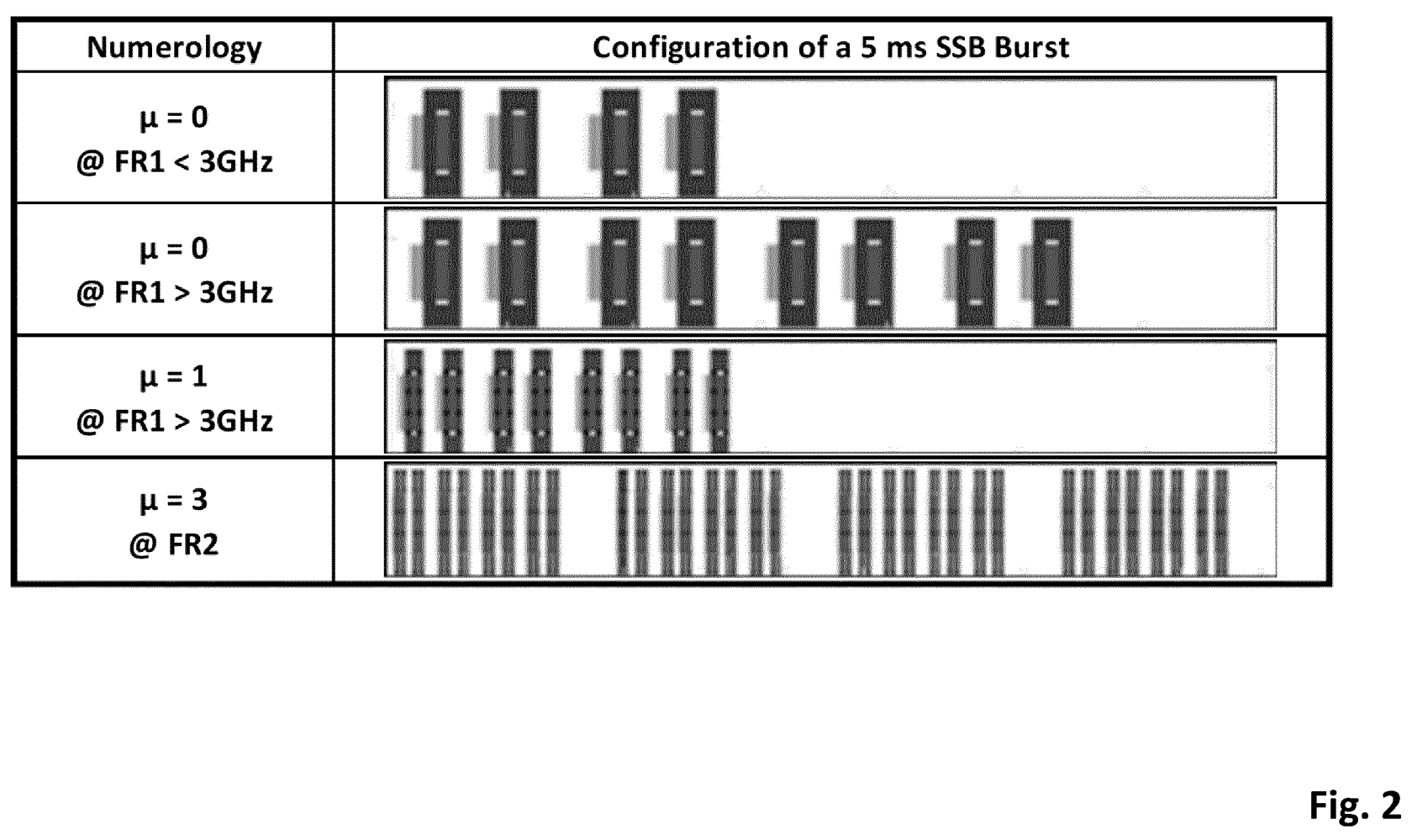

As shown in FIG. 2, in system $\mu$=0 with FR1<3 GHz, the SSB burst comprises four SSBs.

Further, in system $\mu$=0 with FR1>3 GHz, the SSB burst comprises eight SSBs.

In system $\mu$=1 with FR1>3 GHz, the SSB burst comprises eight SSBs.

And in system $\mu$=3 with FR2, the SSB burst comprises 64 SSBs.

In Phase #2, UE specific Channel State Information Reference Signals (CSI-RS) are transmitted in different predefined angular directions by the gNB.

In Phase #3, Sounding Reference Signals (SRS) transmitted by the UE can also be used for UL beam alignment if allocated by the gNB.

Figures 3, 4:
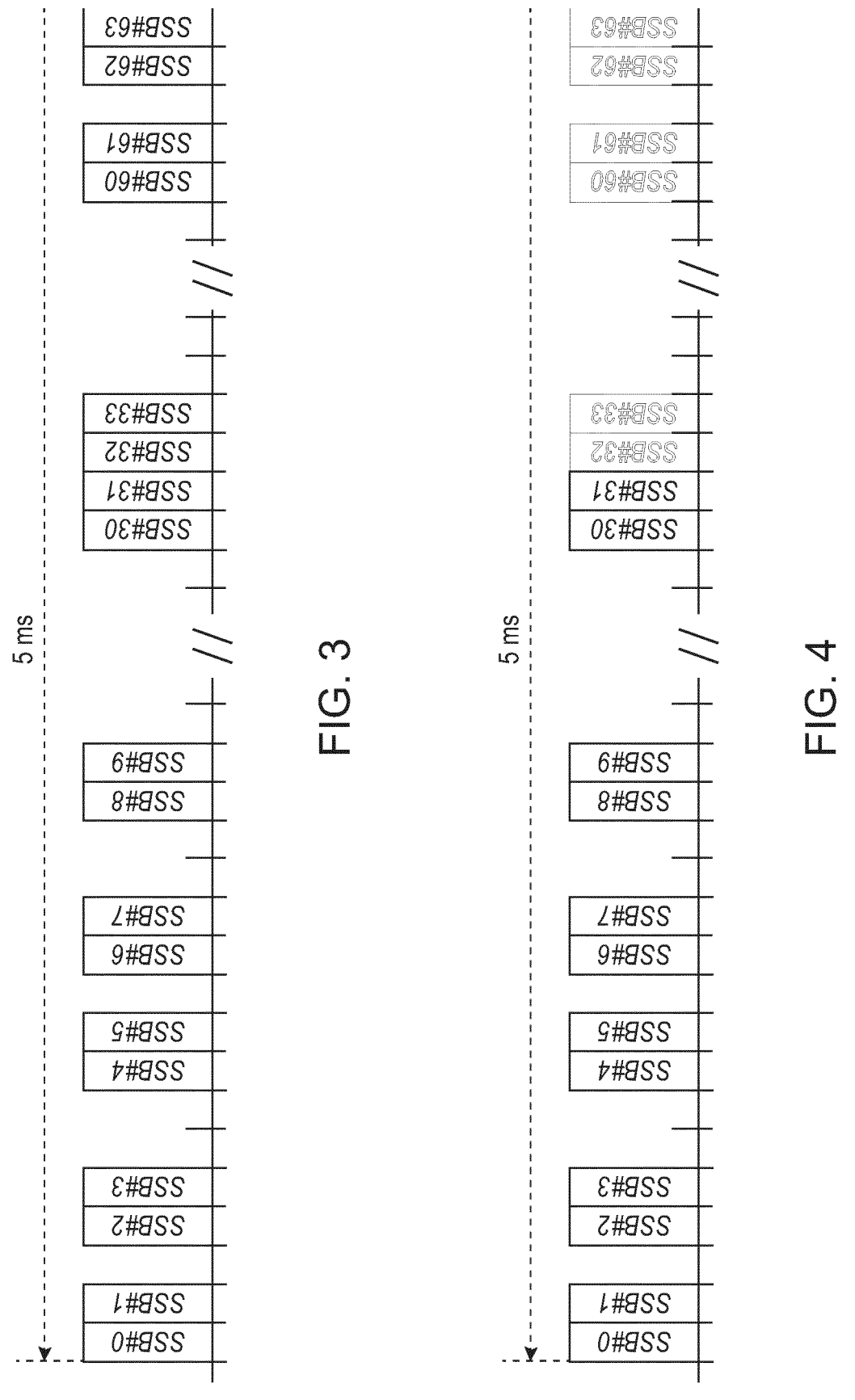
FIG. 3 shows a schematic diagram illustrating a full (64) SSB structure as defined in NR 3GPP Rel. 15.
FIG. 4 shows a schematic diagram illustrating a reduced (32) SSB structure as defined in NR 3GPP Rel. 15.

As described above, the SSB sequence is specified and fixed by 3GPP (TS38.213) for different implementations of Sub-Carrier-Spacings (SCS), meaning that for FR2 (SCS=120 kHz or 240 kHz) a 64 SSB sequence will be pre-allocated and communicated to UEs in the initial access procedure via System Information Block (SIB) 1, which is illustrated in FIG. 3.

According to FIG. 3, within the predetermined time period of 5 ms, up to 64 SSBs (SSB #0 to SSB #63) can be transmitted using narrow beams in predefined directions, and the transmittal is repeated with a predetermined time interval of e.g. 20 ms. In other words, an SSB burst out of the 64 SSBs is transmitted by the gNB in different predefined angular directions with a given periodicity. In FIG. 3, the time period of the SSB burst is 5 ms.

Further, as illustrated in FIG. 3, the SSB sequence of SSB #0 to SSB #63 is associated with a sweep pattern.

As illustrated in FIG. 4, a gNB operating at FR2 frequencies is not required to utilize all of the allocated 64 SSBs (which are also referred to here as "first SSBs") and can be configured to a lower number, like for example 32 SSBs (SSB #0 to SSB #31) (which are also referred to here as "second SSBs"). Such a down scaling is also communicated to the UEs via SIB1 and resources associated with the remaining SSBs (which are also referred to here as "third SSBs") are in principle not utilized. It is noted that the order of SSBs is not limited to that shown in the figures. According to at least some example embodiments, the second SSBs and the third SSBs are interleaved and not only sequentially arranged as shown in the figures. Nevertheless, the connected UEs will still know the resource allocation of these remaining SSB resources even though they are not used.

Further, as illustrated in FIG. 3, the SSB sequence of SSB #0 to SSB #31 is associated with a predetermined sweep pattern.

According to at least some example embodiments, the gNB is enabled to dynamically broadcast and thereby inform UEs within its sector, what the resources associated with the remaining allocated SSBs potentially are used for in case the gNB is configured for a reduced number of SSBs.

Figure 5:
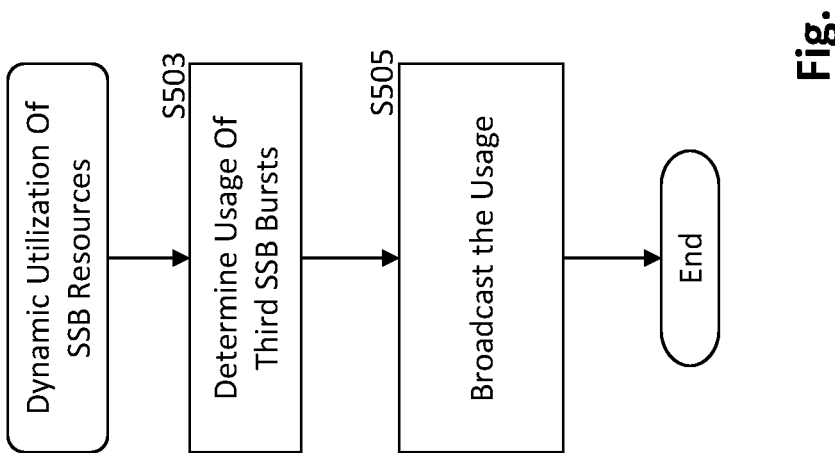
FIG. 5 shows a flowchart illustrating a process of dynamic utilization of SSB resources according to at least some example embodiments.

FIG. 5 shows a flowchart illustrating a process of a dynamic utilization of SSB resources according to at least some example embodiments.

According to at least some example embodiments, the process of FIG. 5 is executed by a network apparatus (e.g. gNB) of an access network of a cellular communication system (e.g. NR).

According to at least some example embodiments, the process of FIG. 5 is started after the network apparatus was configured or re-configured, or when the network apparatus detects a requirement for the gNB to adapt configuration of resources associated with the third SSBs according to the current distribution and requirements of UEs in its sector.

When the process of FIG. 5 has been started, the process advances to step S503 which is performed based on a configuration of a pre-allocated sequence of first SSBs of a first predetermined number. For example, the pre-allocated sequence is the sequence shown in FIG. 4. In this case, the first SSBs are SSB #0 to SSB #63 and the first predetermined number is 64.

In particular, the first SSBs of the first predetermined number comprise second SSBs of a second predetermined number and third SSBs of a third predetermined number, wherein, according to the configuration of the pre-allocated sequence of first SSBs, the second SSBs are to be utilized in a beam management procedure including an initial access procedure and the third SSBs are not necessarily to be utilized in the beam management procedure including the initial access procedure. According to the case illustrated in FIG. 4, the second SSBs are SSB #0 to SSB #31 and the second predetermined number is 32, and the third SSBs are SSB #32 to SSB #63 and the third predetermined number is 32.

Further, the initial access procedure is a procedure that enables UEs to gain initial access to the cellular communication system via the access network, as illustrated in FIG. 1, Phase #1.

In step S503, a usage is determined for resources associated with the third SSBs. Then the process proceeds to step S505.

In step S505, the usage is broadcast in the beam management procedure. Then, the process ends.

According to at least some example embodiments, the process of FIG. 5 further comprises causing, in the initial access procedure, a transmitter to transmit, in a predetermined time period (e.g. 5 ms), the second SSBs using narrow beams in predefined directions, and at least some of the resources associated with the third SSBs configured according to the usage, and repeat the transmittal of the second SSBs using the narrow beams and the at least some of the resources associated with the third SSBs configured according to the usage with a predetermined time interval (e.g. 20 ms).

According to at least some example embodiments, before transmitting the second and third SSBs, an indication of the usage determined for the resources associated with the third SSBs is included in at least one of the first SSBs. Then, in step S505, the at least one of the first SSBs is transmitted in the initial access procedure.

According to at least some example embodiments, alternatively or in addition, an indication of the usage determined for the resources associated with the third SSBs is included in a message to be transmitted in a radio resource control, RRC, connected mode of the beam management procedure. Then, in step S505 the message including the indication is transmitted to UEs which are in the RRC connected mode after having gained access to the network apparatus in the initial access procedure.

In the following, example embodiments of configurations of the resources associated with the third SSBs and example embodiments of signaling to inform the UEs about the usages will be described in more detail.

1. Example Embodiments of Configurations of Resources Associated with the Third SSBs 1) Legacy (Data).

2) Wide beam repetition at the gNB to enable common P3 beam alignment for UEs in the sector covered by the gNB.

3) SSB sweep pattern repetition at the gNB to enable faster P1/P2 beam alignment for the gNB towards UEs in the sector covered by the gNB.

4) Combinations of 1) to 3)

It should be noted that the configurations are not limited to the ones mentioned above, and further configurations and potential use cases which can be envisioned for the reuse of repurposing of remaining allocated SSBs are possible.

1.1 Legacy Configuration

The legacy configuration is as illustrated in FIG. 4 where the resources associated with the remaining allocated SSBs (third SSBs) are not used for beam refinement and can be used for data or other reference signals.

1.2 Wide Beam Repetition Configuration

Figures 6, 7:
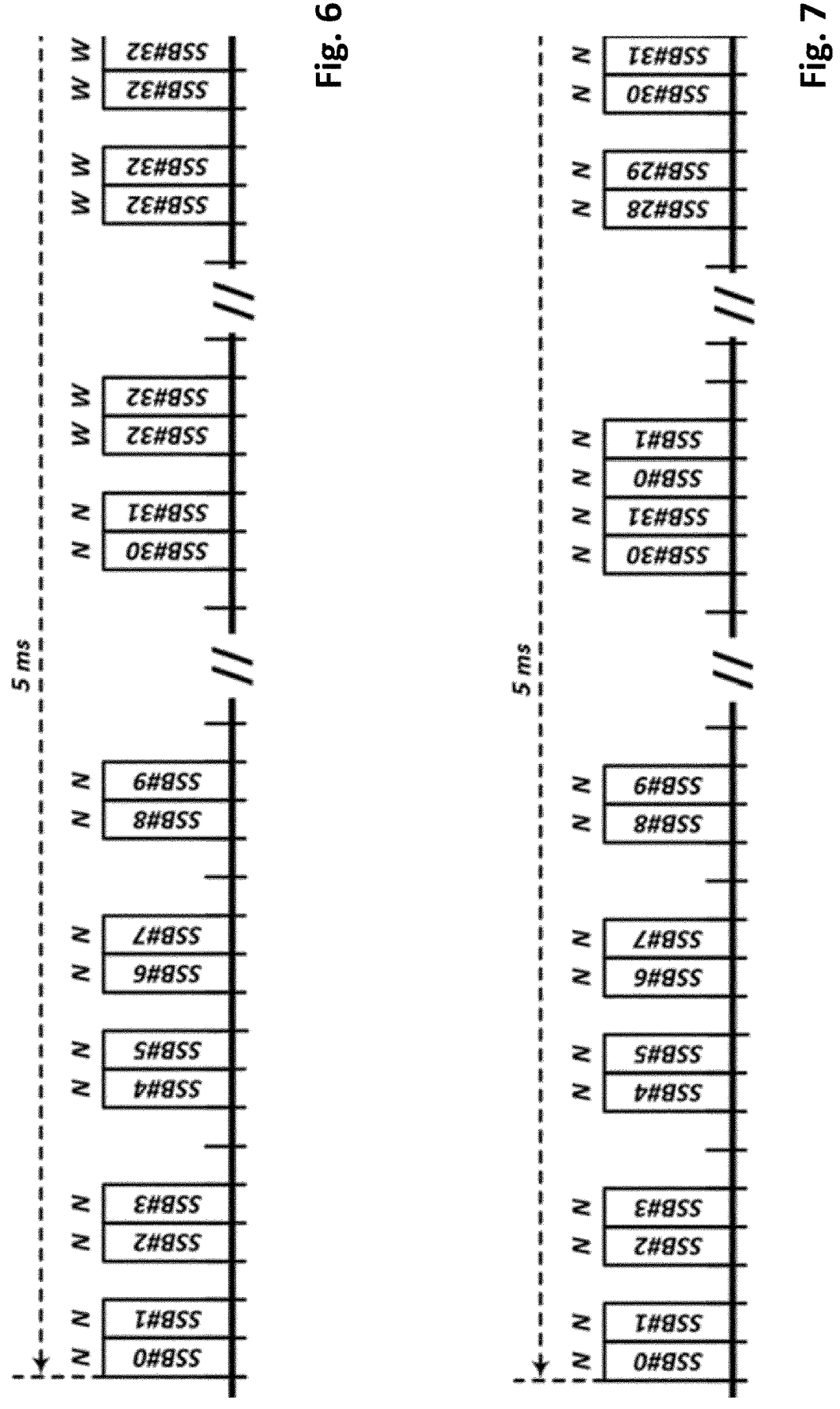
FIG. 6 shows a schematic diagram illustrating a wide beam configuration for resources associated with remaining SSBs according to at least some example embodiments.
FIG. 7 shows a schematic diagram illustrating an SSB repetition configuration for resources associated with remaining SSBs according to at least some example embodiments.

According to at least some example embodiments, the gNB uses the resources associated with the remaining allocated SSBs (third SSBs) to transmit SSB-like reference signals with a wide beam that will cover the full sector of the gNB, as illustrated in FIG. 6. In the example shown in FIG. 6, within the predetermined time period of 5 ms, SSB #0 to SSB #31 (second SSBs) are used for Phase #1 narrow (N) beam transmissions, and after that at least some of the SSB resources #32 to #63 are used to transmit reference signals (indicated as SSB #32 in FIG. 6) using a wide (W) beam.

UEs within that sector will be able to use these wide beam reference signals to align their narrow beam towards the gNB in Phase #3. This means that the UEs are enabled to share the same reference signals for P3, whereby the gNB only will have to transmit Aperiodic CSI-RS with repetition "ON" to an UE at cell edge which might not be able the receive the wide banded SSB-like reference signals (the wide banded SSB signals will have reduced antenna gain). However, that might only become an issue for large cells.

According to at least some example embodiments, the resources associated with the remaining allocated SSBs (third SSBs) are used for a mixture of wideband and semi-wideband transmissions of SSB-like reference signals to increase the coverage of the reference signals, while at the same time still allowing the UE to obtain a rough estimate of the narrow beam alignment need.

Again referring to FIG. 5, according to at least some example embodiments, in step S503, as a first usage, at least some of the resources associated with the third SSBs are allocated to transmit reference signals with a wide beam that covers a sector that is covered by the network apparatus. Then, the transmitter is caused to transmit, in the predetermined time period, the second SSBs using the narrow beams in the predefined directions, and the reference signals using the wide beam, and to repeat the transmittal of the second SSBs using the narrow beams and the reference signals using the wide beam with the predetermined time interval.

According to at least some example embodiments, in step S503, as the first usage, remaining ones of the resources associated with the third SSBs, which are not allocated to transmit the reference signals with the wide beam, are allocated to transmit the reference signals with a semi-wide beam. Then, the transmitter is further caused to transmit the reference signals using the semi-wide beam and repeat the transmittal of the reference signals using the semi-wide beam.

1.3 SSB Pattern Repetition Configuration

The gNB can also configure the resources associated with the remaining allocated SSBs to repeat the SSB sweep pattern as illustrated in FIG. 7, which will decrease the time needed by the gNB and the UEs to perform Intra and Inter beam management, since the UE will be faster to determine and report back to the gNB, which SSB bursts are the best.

FIG. 7 shows an example in which the resources associated with SSB #32 to SSB #63 in FIG. 4 are configured to repeat the sweep pattern of the second SSBs, i.e. SSB #0 to SSB #31.

Referring to FIG. 5, in step S503, as a second usage, at least some of the resources associated with the third SSBs are configured to repeat the predetermined sweep pattern of the second SSBs. Then, the transmitter is caused to transmit, in the predetermined time period, the second SSBs using the narrow beams in the predefined directions, and the at least some of the resources associated with the third SSBs configured to repeat the predetermined sweep pattern a first predetermined number of times, using the narrow beams in the predefined directions, and to repeat the transmittal of the second SSBs and the at least some of the resources associated with the third SSBs configured to repeat the predetermined sweep pattern the first predetermined number of times with the predetermined time interval.

According to at least some example embodiments, for intra beam management, a serving gNB and potential Target gNBs coordinate and align when to use the remaining SSB patterns for repetition. The Serving gNB informs a Target gNB that a UE has triggered a Hand Over procedure and could benefit for SSB burst repetition from the Target gNB to decrease the time need, especially for UEs traveling at high speed.

According to at least some example embodiments, in a variant of the above aspect, the beams that are repeated are selected according to cell planning such that beams that are primarily pointing towards the cell edge will be chosen for the repetition to increase probability of neighbor cell discovery by UEs in other cells.

Referring to FIG. 5, in case of the above aspect, in step S503, as the second usage, at least some of the resources associated with the third SSBs are configured to repeat a predetermined part of the predetermined sweep pattern of the second SSBs. Then, the transmitter is caused to transmit, in the predetermined time period, the second SSBs using the narrow beams in the predefined directions, and the at least some of the resources associated with the third SSBs configured to repeat the predetermined part of the predetermined sweep pattern a first predetermined number of times, using the narrow beams in the predefined directions, and to repeat the transmittal of the second SSBs and the at least some of the resources associated with the third SSBs configured to repeat the predetermined part of the predetermined sweep pattern the first predetermined number of times with the predetermined time interval.

1.4 Advanced Combined Configuration

According to at least some example embodiments, the above configurations (Legacy, Wide & Repetition) are combined depending on current required assistance from the UEs in the gNB sector and the number of remaining allocated SSBs (third SSBs).

In this respect, according to at least some example embodiments, referring to FIG. 5, in step S503, as a third usage, some of the resources associated with the third SSBs are allocated to transmit reference signals with a wide beam that covers a sector that is covered by the network apparatus. Further, in step S503, remaining ones of the resources associated with the third SSBs are configured to repeat at least a part the predetermined sweep pattern.

Then, the transmitter is caused to transmit, in the predetermined time period, (i) the second SSBs using the narrow beams in the predefined directions, (ii) the reference signals using the wide beam, and (iii) the remaining ones of the resources associated with the third SSBs configured to repeat at least part of the predetermined sweep pattern a second predetermined number of times, using the narrow beams in the predefined directions. The transmitter is further caused to repeat, with the predetermined time interval, the transmittal of the second SSBs, the reference signals using the wide beam and the remaining ones of the resources associated with the third SSBs configured to repeat at least part of the predetermined sweep pattern the second predetermined number of times.

According to at least some example embodiments, in addition, in step S503, as the third usage, remaining ones of the resources associated with the third SSBs, which are not allocated to transmit the reference signals with the wide beam or repeat at least part of the predetermined sweep pattern, are allocated to transmit the reference signals with a semi-wide beam. Then, the transmitter is further caused to transmit the reference signals using the semi-wide beam and repeat the transmittal of the reference signals using the semi-wide beam.

According to at least some example embodiments, in addition, in step S503, as the third usage, still remaining ones of the resources associated with the third SSBs, which are not allocated to transmit the reference signals and are not configured to repeat the predetermined sweep pattern, are allocated to transmit data. Then, the transmitter is further caused to transmit the data in the predetermined time period and repeat the transmittal of the data with the predetermined time interval.

According to at least some example embodiments, the gNB is enabled to dynamically broadcast which configuration is used for the remaining SSB bursts (resources associated with third SSBs), so that the gNB can adapt this according to the current distribution and requirements of UEs in its sector.

2. Example Embodiments of Signaling

According to at least some example embodiments, UEs are informed of the actual re-purpose method being active using signaling from gNB to the UEs. For example, this signaling is part of a System Information Block (SIB) message to enable this feature for Initial Access (AI) and in connected mode (RRC).

2.1 Signal Implementation for Initial Access (IA)

According to at least some example embodiments, this implementation is achieved by adding 1 bit to an optional new field in the SIB2 message (Release 15: 3GPP TS 38.331 V15.10.0 (2020-07)), as illustrated in FIG. 8 where the text within dotted lines highlights the new field called Remaining-ssb in this example. It should be noted that even that there is only one bit reserved in the field, the optionality indication is another state, so the indication will use a total of three states (using two bits).

Referring to the above description of FIG. 5, according to at least some example embodiments, the indication of the usage determined for the resources associated with the third SSBs is included in a system information block 2, SIB2, message to be indicated in the at least one of the first SSBs in the initial access procedure.

The interpretation of this optional new message and the associated bit is as follows:

If the field is absent: Legacy behavior.

Field is present and the bit value is 0: Repeated SSB sweep pattern (also referred to above as second usage).

Field is present and the bit value is 1: Static wide SSB like beams (also referred to above as first usage).

If more than three purposes are envisioned, according to at least some example embodiments, the indication of Remaining-ssb Information element (IE) is extended to cover more bits and hence allow for indication of a larger set of re-purpose options and their usage.

The single bit implementation described above is useful for enabling this feature for initial access, since the bit size of the SIB broadcast messages should be kept at a minimum (even that the indication will use 3 signaling states and use two bits).

2.2 Signal Implementation for Radio Resource Control (RRC) Connection

According to at least some example embodiments, a more advanced implementation is included for UEs in connected mode by increasing the number of assigned bits, which will also increase the effectiveness and robustness of the utilization of SSB resources. During RRC connected mode, the gNB is enabled to indicate specific use for the resources in a dedicated manner to a given UE, as highlighted below:

By knowing whether or not the UE is aware of the configuration, the gNB will be able to better utilize the resources. According to at least some example embodiments, such awareness is obtained through either RRC feedback or by HARQ-ACK for the cases where lower layer signaling such as MAC-CE or DCI is used for the indication.

Having acknowledgement of the UEs understanding of the configuration allows the gNB to know which UE can utilize the currently configured remaining SSB bursts and which UEs will need legacy assistance like Aperiodic CSI-RS with repetition set to "ON".

This signal implementation supports a combination of the mentioned implementations "Data", "SSB repetition" and "static wide beam" described in section 1.

According to at least some example embodiments, the bits needed for implementation of this feature in connected mode are included in IEs that are associated with MIMO operation (or extensions of the MIMO related IEs) as described below:

1-Bit Solution:

As described in section 2.1

The 1-bit implementation can be used for configuration where half of the allocated SSB bursts are used for the SSB sweep pattern.

2-Bit Solution:

00: SSB burst repetition(s)

01: Static wide beams

10: One SSB repetition and thereafter Static wide beams

11: Two SSB repetition and thereafter Static wide beams

The 2-bit implementation can be used for configuration where less than half of the allocated SSB bursts are used for the SSB sweep pattern. Remaining allocated SSB resources in the two first configurations (00 and 01) can be used to allocate Data.

3-Bit Solution:

000: SSB burst repetition(s)

001: Static wide beams

010: One SSB repetition and thereafter Static wide beams

011: Two SSB repetition and thereafter Static wide beams

. . . (list continues with various configuration options)

111: . . .

Referring to the above description of FIG. 5, according to at least some example embodiments, the indication of the usage determined for the resources associated with the third SSBs is included in at least one information element of a message associated with MIMO operation, which is transmitted in RRC connected mode of the beam management procedure.

Advantages

At least some example embodiments allow for full utilization of the allocated SSB resources without significant increase in the associated signaling overhead.

According to at least some example embodiments, there is reduced overhead for P3, since the need for transmitting Aperiodic CSI-RS with repetition set to "ON" is reduced significantly.

According to at least some example embodiments, faster Intra and Inter beam management (P3) is provided due to repetition of the SSB bursts.

According to at least some example embodiments, dynamic optimization is achieved to cope with the current operational conditions of the gNB section.

According to at least some example embodiments, the remaining allocated SSB bursts are used to transmit SSB like reference signals in a wide beam that covers the sector of the gNB, which then can be used by the UEs for Inter and Intra beam management.

According to at least some example embodiments, the remaining allocated SSB bursts are used to repeat the SSB sweep pattern, which then can be used by the UEs for Inter and Intra beam management.

According to at least some example embodiments, the currently used configuration of the remaining SSB bursts is dynamically broadcast to the UEs in the gNB sector.

According to at least some example embodiments, the Serving cell (gNB) informs and coordinates with the Target cell(s) (gNB(s)) via Xn interface, when to configure a repetition of the SSB sweep.

According to at least some example embodiments, efficiency (latency, overhead) of beam refinement is improved, and potential for reduced neighbor cell discovery delay is provided.

Figure 9:
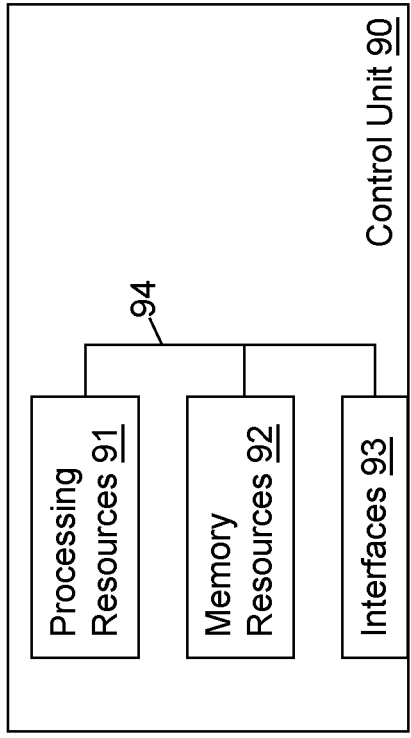
FIG. 9 shows a schematic block diagram illustrating a configuration of a control unit in which at least some example embodiments are implementable.

Now reference is made to FIG. 9 illustrating a simplified block diagram of a control unit 90 that is suitable for use in practicing at least some example embodiments. According to an implementation example, the process of FIG. 5 is implemented by the control unit 90.

The control unit 90 comprises processing resources (e.g. processing circuitry) 91, memory resources (e.g. memory circuitry) 92 and interfaces (e.g. interface circuitry) 93, which are coupled via a wired or wireless connection 94.

According to an example implementation, the memory resources 92 are of any type suitable to the local technical environment and are implemented using any suitable data storage technology, such as semiconductor based memory devices, magnetic memory devices and systems, optical memory devices and systems, fixed memory and removable memory. The processing resources 91 are of any type suitable to the local technical environment, and include one or more of general purpose computers, special purpose computers, microprocessors, digital signal processors (DSPs) and processors based on a multi core processor architecture, as non limiting examples.

According to an implementation example, the memory resources 92 comprise one or more non-transitory computer-readable storage media which store one or more programs that when executed by the processing resources 91 cause the control unit 10 to function as a network apparatus (e.g. gNB) as described above.

Further, as used in this application, the term "circuitry" refers to one or more or all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to at least some example embodiments, a network apparatus of an access network of a cellular communication system is provided. For example, the network apparatus comprises the control unit 90 shown in FIG. 9.

The network apparatus comprises means for, based on a configuration of a pre-allocated sequence of first SSBs of a first predetermined number, wherein the first SSBs of the first predetermined number comprise second SSBs of a second predetermined number and third SSBs of a third predetermined number, wherein, according to the configuration of the pre-allocated sequence of first SSBs, the second SSBs are to be utilized in a beam management procedure including an initial access procedure and the third SSBs are not necessarily to be utilized in the beam management procedure including the initial access procedure, wherein the initial access procedure enables user equipments, UEs, to gain initial access to the cellular communication system via the access network, determining a usage for resources associated with the third SSBs, and means for broadcasting the usage in the beam management procedure.

According to at least some example embodiments, the network apparatus further comprises means for causing, in the initial access procedure, a transmitter to transmit, in a predetermined time period, the second SSBs using narrow beams in predefined directions, and at least some of the resources associated with the third SSBs configured according to the usage, and repeat the transmittal of the second SSBs using the narrow beams and the at least some of the resources associated with the third SSBs configured according to the usage with a predetermined time interval.

According to at least some example embodiments, the network apparatus further comprises means for, before transmitting the second and third SSBs, including an indication of the usage determined for the resources associated with the third SSBs in at least one of the first SSBs, wherein the broadcasting comprises the transmitting of the at least one of the first SSBs in the initial access procedure.

According to at least some example embodiments, the network apparatus further comprises means for including an indication of the usage determined for the resources associated with the third SSBs in a message to be transmitted in a radio resource control, RRC, connected mode of the beam management procedure, wherein the broadcasting comprises transmitting the message including the indication to UEs which are in the RRC connected mode after having gained access to the network apparatus in the initial access procedure.

According to at least some example embodiments, the determining the usage comprises, as a first usage, allocating at least some of the resources associated with the third SSBs to transmit reference signals with a wide beam that covers a sector that is covered by the network apparatus, wherein, in the initial access procedure, the transmitter is caused to transmit, in the predetermined time period, the second SSBs using the narrow beams in the predefined directions, and the reference signals using the wide beam, and repeat the transmittal of the second SSBs using the narrow beams and the reference signals using the wide beam with the predetermined time interval.

According to at least some example embodiments, as the first usage, remaining ones of the resources associated with the third SSBs, which are not allocated to transmit the reference signals with the wide beam, are allocated to transmit the reference signals with a semi-wide beam, wherein, in the initial access procedure, the transmitter is further caused to transmit the reference signals using the semi-wide beam and repeat the transmittal of the reference signals using the semi-wide beam.

According to at least some example embodiments, as the first usage, remaining ones of the resources associated with the third SSBs, which are not allocated to transmit the reference signals, are allocated to transmit data, wherein, in the initial access procedure, the transmitter is further caused to transmit the data in the predetermined time period and repeat the transmittal of the data with the predetermined time interval.

According to at least some example embodiments, the second SSBs are associated with a predetermined sweep pattern, and the determining of the usage comprises, as a second usage, configuring at least some of the resources associated with the third SSBs to repeat at least a part of the predetermined sweep pattern, and wherein, in the initial access procedure, the transmitter is caused to transmit, in the predetermined time period, the second SSBs using the narrow beams in the predefined directions, and the at least some of the resources associated with the third SSBs configured to repeat at least part of the predetermined sweep pattern a first predetermined number of times, using the narrow beams in the predefined directions, and repeat the transmittal of the second SSBs and the at least some of the resources associated with the third SSBs configured to repeat at least part of the predetermined sweep pattern the first predetermined number of times with the predetermined time interval.

According to at least some example embodiments, as the second usage, remaining ones of the resources associated with the resources associated with the third SSBs, which are not configured to repeat the predetermined sweep pattern, are allocated to transmit data, wherein, in the initial access procedure, the transmitter is further caused to transmit the data in the predetermined time period and repeat the transmittal of the data with the predetermined time interval.

According to at least some example embodiments, the second SSBs are associated with a predetermined sweep pattern, and the determining of the usage comprises, as a third usage, allocating some of the resources associated with the third SSBs to transmit reference signals with a wide beam that covers a sector that is covered by the network apparatus, and configuring remaining ones of the resources associated with the third SSBs to repeat at least a part the predetermined sweep pattern, wherein, in the initial access procedure, the transmitter is caused to transmit, in the predetermined time period, the second SSBs using the narrow beams in the predefined directions, the reference signals using the wide beam, and the remaining ones of the resources associated with the third SSBs configured to repeat at least part of the predetermined sweep pattern a second predetermined number of times, using the narrow beams in the predefined directions, and repeat the transmittal of the second SSBs, the reference signals using the wide beam and the remaining ones of the resources associated with the third SSBs configured to repeat at least part of the predetermined sweep pattern the second predetermined number of times with the predetermined time interval.

According to at least some example embodiments, as the third usage, remaining ones of the resources associated with the third SSBs, which are not allocated to transmit reference signals with the wide beam or repeat at least part of the predetermined sweep pattern, are allocated to transmit the reference signals with a semi-wide beam, wherein, in the initial access procedure, the transmitter is further caused to transmit the reference signals using the semi-wide beam and repeat the transmittal of the reference signals using the semi-wide beam.

According to at least some example embodiments, as the third usage, still remaining ones of the resources associated with the third SSBs, which are not allocated to transmit the reference signals and are not configured to repeat at least part of the predetermined sweep pattern, are allocated to transmit data, wherein, in the initial access procedure, the transmitter is further caused to transmit the data in the predetermined time period and repeat the transmittal of the data with the predetermined time interval.

According to at least some example embodiments, the reference signals enable UEs in the sector to use these reference signals to align their narrow beam towards the network apparatus.

According to at least some example embodiments, the network apparatus further comprises means for coordinating usage of the resources associated with the third SSBs to repeat the predetermined sweep pattern with potential target access nodes of the access network.

According to at least some example embodiments, the indication of the usage determined for the resources associated with the third SSBs is included in a SIB2 message to be indicated in the at least one of the first SSBs in the initial access procedure.

According to at least some example embodiments, the indication is included in an information element associated with a MIMO operation.

According to at least some example embodiments, the network apparatus further comprises means for using feedback from UEs to acquire information on whether the UEs utilize a configuration of the resources associated with the third SSBs, the configuration being associated with the usage determined for the resources associated with the third SSBs, and means for re-determining the usage based on the information.

It is to be understood that the above description is illustrative and is not to be construed as limiting the application to the example embodiments described above. Various modifications and applications may occur to those skilled in the art without departing from the true spirit and scope as defined by the appended claims.

What is claimed is:

1. An apparatus, comprising:

at least one processor; and at least one memory including computer program code for a gNB of a Radio Access Network (RAN), wherein the at least one memory and the computer program code being configured to, with the at least one processor, cause the apparatus at least to:

based on a configuration of a pre-allocated sequence of first synchronization signal blocks (SSBs) comprising 64 SSBs, wherein the first SSBs comprise 32 second SSBs and 32 third SSBs, and wherein the second SSBs are utilized in a beam management procedure, and the third SSBs are not utilized in the beam management procedure, determine a usage for resources associated with the third SSBs, wherein the usage comprises:

a first usage comprising allocating a first set of resources associated with the third SSBs to transmit reference signals with a wide beam to cover a sector that is covered by the apparatus;

a second usage comprising configuring a second set of resources associated with the third SSBs to repeat at least a part of a predetermined sweep pattern associated with the second SSBs; and a third usage comprising allocating a third set of resources associated with the third SSBs to transmit the reference signals with the wide beam to cover the sector that is covered by the apparatus, and a fourth set of resources associated with the third SSBs, the fourth set being different from the third set, to repeat at least the part of the predetermined sweep pattern associated with the second SSBs;

cause a transmitter to broadcast, to one or more user equipment (UEs), an indication of the determined usage in the beam management procedure, wherein the indication of the usage is included in one of a system information block 2 (SIB2) message indicated in at least one of the first SSBs in an initial access procedure, or in a message transmitted in a radio resource control (RRC) connected mode of the beam management procedure, and wherein the initial access procedure enables a UE of the one or more UEs to gain access to a cellular communication system comprising the RAN; and cause the transmitter to transmit, to the one or more UEs, within a predetermined time period, the second SSBs using narrow beams in predefined directions, and the resources associated with the third SSBs, configured according to the determined usage, wherein the transmission of the second SSBs is repeated with a predetermined time interval.

2. The apparatus of claim 1, wherein the computer program code, when executed by the at least one processor, further causes the apparatus to:

coordinate, with one or more potential target access nodes of the RAN, the usage of the resources associated with the third SSBs to repeat the predetermined sweep pattern.

3. The apparatus of claim 2, wherein the message transmitted in the RRC connected mode comprises an information element associated with a multiple input multiple output (MIMO) operation.

4. The apparatus of claim 3, wherein the computer program code, when executed by the at least one processor, further causes the apparatus to:

use feedback from the one or more UEs to acquire information on whether the one or more UEs are utilizing a configuration of the resources associated with the third SSBs, the configuration being associated with the determined usage; and based on the acquired information, re-determine the usage for one or more of the resources associated with the third SSBs.

5. An apparatus comprising:

at least one processor; and at least one memory including a computer program code for a user equipment (UE), wherein the at least one memory and the computer program code being configured to, with the at least one processor, cause the apparatus at least to:

receive, from a gNB, an indication of usage for resources associated with third synchronization signal blocks (SSBs) in a beam management procedure, wherein:

a pre-allocated sequence of first SSBs comprises 64 SSBs, the first SSBs comprise 32 second SSBs and 32 the third SSBs,

according to a configuration of the pre-allocated sequence of the first SSBs, the second SSBs are utilized in the beam management procedure, and the third SSBs are not utilized in the beam management procedure, wherein the usage indicated to the apparatus comprises:

a first usage in which a first set of resources associated with the third SSBs are used to receive reference signals transmitted with a wide beam to cover a sector of a gNB operating in a frequency range 2 (FR2);

a second usage in which a second set of resources associated with the third SSBs are used to receive a repetition of at least a part of a predetermined sweep pattern associated with the second SSBs; and a third usage in which a third set of resources associated with the third SSBs are used to receive the reference signals transmitted with the wide beam, and for a fourth set of the resources associated with the third SSBs, the fourth set being different from the third set, are used to receive the repetition of at least the part of the predetermined sweep pattern associated with the second SSBs; and the indication of the usage is received in one of a system information block 2 (SIB2) message during an initial access procedure or in a message during a radio resource control (RRC) connected mode of the beam management procedure, and wherein the initial access procedure enables the apparatus to gain access to a cellular communication system including the gNB; and perform the beam management procedure based on the received indication of usage, wherein performing the beam management procedure includes measuring the second SSBs transmitted using narrow beams in predefined directions during a predetermined time period and processing the resources associated with the third SSBs as configured according to the received indication of usage, and wherein transmission of the second SSBs and the resources associated with the third SSBs is repeated with a predetermined time interval.

6. The apparatus of claim 5, wherein the SIB2 message is received based on at least one of the first SSBs before receiving the second and third SSBs.

7. The apparatus of claim 6, wherein the message transmitted in the RRC connected mode comprises an information element associated with a multiple input multiple output (MIMO) operation.

8. A method performed by a user equipment (UE), the method comprising:

receiving, from a gNB, an indication of usage for resources associated with third synchronization signal blocks (SSBs) in a beam management procedure, wherein:

a pre-allocated sequence of first SSBs comprises 64 SSBs, the first SSBs comprises 32 second SSBs and 32 the third SSBs, according to a configuration of the pre-allocated sequence of the first SSBs, the second SSBs are utilized in the beam management procedure, and the third SSBs are not utilized in the beam management procedure, the usage indicated to the UE comprises:

a first usage in which a first set of the resources associated with the third SSBs are used to receive reference signals transmitted with a wide beam to cover a sector of a gNB operating in a frequency range 2 (FR2);

a second usage in which a second set of the resources associated with the third SSBs are used to receive a repetition of at least a part of a predetermined sweep pattern associated with the second SSBs; and a third usage in which a third set of the resources associated with the third SSBs are used to receive the reference signals transmitted with the wide beam, and for a fourth set of the resources associated with the third SSBs, the fourth set being different from the third set, and used to receive the repetition of at least the part of the predetermined sweep pattern associated with the second SSBs; and the indication of the usage is received in one of a system information block 2 (SIB2) message during an initial access procedure, or in a message during a radio resource control (RRC) connected mode of the beam management procedure, and wherein the initial access procedure enables the UE to gain access to a cellular communication system including the gNB; and performing the beam management procedure based on the received indication of usage, wherein performing the beam management procedure includes measuring the second SSBs transmitted using narrow beams in pre-defined directions during a predetermined time period and processing the resources associated with the third SSBs configured according to the received indication of usage, and wherein the transmission of the second SSBs and the resources associated with the third SSBs is repeated with a predetermined time interval.

* * * * *